(12) United States Patent
Barnett et al.

(10) Patent No.: US 10,628,806 B2
(45) Date of Patent: Apr. 21, 2020

(54) SYSTEM AND METHOD FOR TEST DATA PROVISIONING

(71) Applicant: American Express Travel Related Services Co., Inc., New York, NY (US)

(72) Inventors: Lee A. Barnett, Phoenix, AZ (US); Satish K. Jayaraman, Phoenix, AZ (US)

(73) Assignee: AMERICAN EXPRESS TRAVEL RELATED SERVICES COMPANY, INC, New York, NY (US)

( * ) Notice: Subject to any disclaimer, the term of this patent is extended or adjusted under 35 U.S.C. 154(b) by 1161 days.

(21) Appl. No.: 14/970,859

(22) Filed: Dec. 16, 2015

(65) Prior Publication Data
US 2017/0178087 A1 Jun. 22, 2017

(51) Int. Cl.
G06Q 40/00 (2012.01)
G06Q 20/02 (2012.01)
G06F 16/28 (2019.01)
G06Q 20/40 (2012.01)

(52) U.S. Cl.
CPC ......... *G06Q 20/027* (2013.01); *G06F 16/283* (2019.01); *G06Q 20/40* (2013.01); *G06Q 40/00* (2013.01)

(58) Field of Classification Search
CPC ............. G06F 11/3684; G06F 11/3672; G06F 11/3668; H04L 29/06; H04L 63/20; H04L 63/205
USPC ...................................................... 705/39–42
See application file for complete search history.

(56) References Cited

U.S. PATENT DOCUMENTS

| | | | |
|---|---|---|---|
| 7,404,123 B1 | 7/2008 | Ku et al. | |
| 7,702,613 B1 * | 4/2010 | Dankenbring | G06F 11/3684 707/687 |
| 8,548,950 B2 * | 10/2013 | Moore | G06F 16/13 707/661 |
| 8,984,341 B1 * | 3/2015 | Chandrasekharapuram | G06F 11/263 714/32 |
| 2005/0229159 A1 * | 10/2005 | Haba | G06F 11/3672 717/122 |
| 2010/0257140 A1 * | 10/2010 | Davis | G06F 16/113 707/661 |

(Continued)

OTHER PUBLICATIONS

K. Krishna Murthy and Janardhana S Channagiri, "Test Data Management—enabling reliable testing through realistic test data", Oct. 2009.*

(Continued)

*Primary Examiner* — Hani M Kazimi
(74) *Attorney, Agent, or Firm* — Thomas | Horstemeyer, LLP

(57) ABSTRACT

Systems and methods of improving the operation of a test data provisioning network and test data provisioning network devices is disclosed. A data hub layer comprising an interstitial logic boundary at a periphery of a consumption environment and configured to interact with a production environment whereby test data may be provisioned without direct access by a user to the production environment. In this manner, the efficiency and resiliency of the production environment may be enhanced and the test data may be improved, so that the network more properly functions according to approved parameters.

19 Claims, 3 Drawing Sheets

(56) References Cited

U.S. PATENT DOCUMENTS

| | | | |
|---|---|---|---|
| 2011/0137872 A1* | 6/2011 | Coldicott | G06F 16/212 |
| | | | 707/665 |
| 2013/0104105 A1 | 4/2013 | Brown et al. | |
| 2013/0219217 A1 | 8/2013 | Seren et al. | |
| 2014/0101129 A1* | 4/2014 | Branish, II | G06F 16/972 |
| | | | 707/714 |
| 2014/0282848 A1 | 9/2014 | Patwardhan et al. | |

OTHER PUBLICATIONS

International Search Report and Written Opinion dated Feb. 16, 2017 in Application No. PCT/US2016/063113.

Actifio, "Actifio for DevOps," IDC MaturityScape: DevOps 1.0, Doc # 249471, Jun. 2014, retrieved from http://cdn2.hubspot.net/hubfs/214442/ACT-15-97_Actifio_DevOps_White_Paper-150605d-pq.pdf?t=1433696084490, pp. 1-7.

International Preliminary Report on Patentability dated Jun. 16, 2017 in Application No. PCT/US2016/063113.

\* cited by examiner

SYSTEM AND METHOD FOR TEST DATA PROVISIONING

FIELD

This disclosure relates to data analytics for transaction data.

BACKGROUND

Large data sets may exist in various sizes and with various levels of organization. With large data comprising data sets as large as ever, the volume of data collected incident to the increased popularity of online and electronic transactions continues to grow. Billions of rows and hundreds of thousands of columns worth of data may populate a single table, for example. An example of the use of large data is in assembling test data sets to perform analysis of transaction data, which is frequently a key priority for transaction account issuers. In that regard, transactions processed by the transaction account issuer are massive in volume and comprise tremendously large data sets.

Large data sets may have challenges. For example, a user may desire to retrieve a test data set for analysis of transaction data. The user may want to limit a test data set to a subset of fields otherwise available in the large data set. The process of determining the desired limitations is frequently time consuming. Moreover, the process of sorting and filtering the large data set to conform to the desired limitations, then providing it to the proper user is also time consuming and uses a large amount of computing resources, particularly if the data is desired to be updated at some interval. These limitations often hamper the availability of test data sets, result in use of stale test data, and frustrate and confuse the analysis of the transaction data, which obscures identification of real-world entities and individuals behind transactions.

SUMMARY

A data hub layer is disclosed. The data hub layer may include an interstitial logical boundary at a periphery of a consumption environment and configured to interact with a production environment, wherein the data hub layer further includes a processor, and a tangible, non-transitory memory configured to communicate with the processor, the tangible, non-transitory memory having instructions stored thereon that, in response to execution by the processor, cause the processor to perform operations. The data hub layer may also include a custom data hub including a custom resource within the data hub layer configured to receive a test data characteristic from a user and configured to retrieve tailored data corresponding to the test data characteristic from a golden copy database. In various embodiments the custom data hub transmits the tailored data corresponding to the test data characteristic to the user.

In various embodiments, the golden copy database includes a periodically updated database configured to receive data retrieved from the production environment. In various embodiments, the production environment includes a production data system configured to authorize transaction account transactions. In various embodiments, the user is an automated process. In various embodiments, the custom data hub further includes an update controller including a polling engine configured to poll the golden copy database at a first custom hub polling interval to retrieve the data corresponding to the test data characteristic. In various embodiments, the first custom hub polling interval is set by a hub configurator configured to receive user requests from a user configuration portal and direct the data hub layer to provision the custom data hub having the update controller for the user in response to the user requests from the user configuration portal. In various embodiments, the user configuration portal includes an interface, wherein the user may request the data hub layer to provision the custom data hub, and wherein the user may submit the test data characteristic and receive the tailored data.

A system for test data provisioning is disclosed. The system may include a consumption environment having a data hub layer including an interstitial logical boundary at a periphery of the consumption environment and configured to interact with a production environment, wherein the data hub layer further includes a custom data hub including a custom resource within the data hub layer configured to receive a test data characteristic from a user and configured to retrieve data corresponding to the test data characteristic from the production environment. In various embodiments, the custom data hub further includes an update controller including a polling engine configured to poll a golden copy database at a first custom hub polling interval to retrieve the data corresponding to the test data characteristic. In various embodiments, the custom data hub transmits tailored data to the user, the tailored data corresponding to the test data characteristic.

In various embodiments, the data corresponding to the test data characteristic is retrieved from the golden copy database of the production environment. In various embodiments, the golden copy database includes a periodically updated database configured to receive data retrieved from a production data system. In various embodiments, the production environment includes a subset/scrub/mask controller connecting the production data system to the golden copy database, wherein data may be retrieved from the production data system and stored in the golden copy database, wherein the production data system may be isolated from the consumption environment. In various embodiments, the subset/scrub/mask controller includes an update controller configured to retrieve the data from the production data system and store the data in the golden copy database in response to a first golden copy database polling interval elapsing. In various embodiments, the consumption environment further includes a hub configurator configured to receive user requests from a user configuration portal, wherein the hub configurator is further configured to direct the data hub layer to provision a new custom data hub having a custom update controller for the user, in response to the user requests from the user configuration portal. In various embodiments, the consumption environment further includes the user configuration portal comprising an interface, wherein the user may request the data hub layer to provision the new custom data hub, and wherein the user may submit the test data characteristic and receive the tailored data. In various embodiments, the production environment includes a production data system configured to authorize transaction account transactions. In various embodiments, the user is an automated process.

A method of test data provisioning is disclosed. The method may include receiving by a data hub layer, a test data characteristic from a user, determining by an access regulator that the user is authorized to receive tailored data corresponding to the test data characteristic, retrieving, by a custom data hub of the data hub layer, in response to the user being authorized, tailored data corresponding to the test data characteristic from a golden copy database, and updating, by an update controller of the custom data hub, the tailored data in response to a first custom hub polling interval elapsing.

In various embodiments, the method may further include requesting, by a subset/scrub/mask controller, data from a production data system and delivering the data to the golden copy database, wherein the production data system is isolated from direct interaction with the data hub layer.

In various embodiments, the method may further include wherein the data hub layer includes an interstitial logical boundary at a periphery of a consumption environment and configured to interact with a production environment, wherein the data hub layer further includes a processor, and a tangible, non-transitory memory configured to communicate with the processor, the tangible, non-transitory memory having instructions stored thereon that, in response to execution by the processor, cause the processor to perform operations. In various embodiments, the method may further include wherein the custom data hub includes a custom resource within the data hub layer configured to receive the test data characteristic from the user and configured to retrieve the tailored data corresponding to the test data characteristic from the golden copy database, and wherein the custom data hub transmits the tailored data corresponding to the test data characteristic to the user. In various embodiments, the method may further include the production data system is configured to provide services for which test data may be usefully related, for instance, to authorize transaction account transactions.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
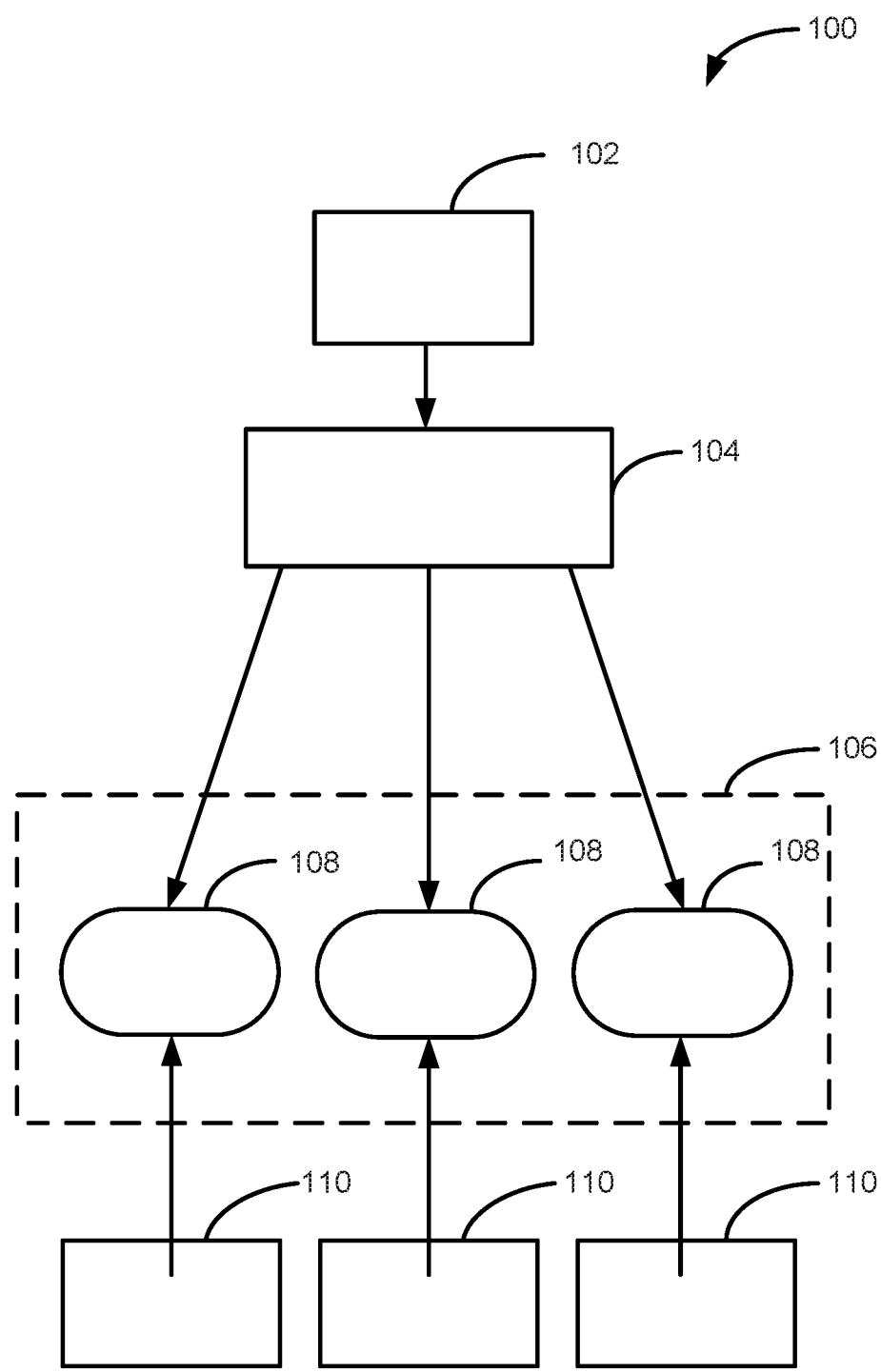
FIG. 1 illustrates an exemplary transaction processing network, in accordance with various embodiments.

With reference to FIG. 1, production data system 100 may comprise a transaction account data processing system configured to authorize transaction account transactions. Production data system 100 may comprise various components, as shown in FIG. 1, in accordance with various embodiments. Production data system 100 may comprise a data storage controller 102. Data storage controller 102 may comprise any device capable of receiving and/or processing an electronic message via telecommunications transfer channel 104. Telecommunications transfer channel 104 may comprise a network. Data storage controller 102 may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data (e.g., transaction data) over telecommunications transfer channel 104.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

A network may not be secure. Thus, communication over the network may utilize data encryption. Encryption may be performed by way of any of the techniques now available in the art or which may become available—e.g., Twofish, RSA, El Gamal, Schorr signature, DSA, PGP, PM, GPG (GnuPG), and symmetric and asymmetric cryptography systems.

In various embodiments, data storage controller 102 may interact with distributed storage system 106 for storage and/or processing of large data sets. As used herein, large data may refer to partially or fully structured, semi-structured, or unstructured data sets including millions of rows and hundreds of thousands of columns. A large data set may be compiled, for example, from a history of purchase transactions over time, from web registrations, from social media, from records of charge (ROC), from summaries of charges (SOC), from internal data, or from other suitable sources. Large data sets may be compiled without descriptive metadata such as column types, counts, percentiles, or other interpretive-aid data points.

In various embodiments, distributed storage system 106 may comprise one or more nodes 108. Nodes 108 may comprise computers or processors the same as or similar to data storage controller 102. Nodes 108 may be distributed geographically in different locations, housed in the same building, and/or housed in the same rack. Nodes 108 may also be configured to function in concert to provide storage space and/or processing power greater than one of a node 108 may provide alone. As a result, distributed storage system 106 may collect and/or store data 110. Data 110 may be collected by nodes 108 individually and compiled, or data 110 may be collected by nodes 108 in concert and collated. Data 110 may further be compiled into a data set and formatted for use by data storage controller 102.

In various embodiments, data 110 may comprise a collection of data including and/or originating from account holder information, transaction information, account information, record of sales, account history, customer history, sensor data, machine log data, data storage system, public web data, and/or social media. Data 110 may be collected from multiple sources and amalgamated into a large data structure such as a file, for example. In that regard, the data may be used as an input to generate metadata describing the large data structure itself, as well as the data stored in the structure.

In various embodiments, the data 110 may comprise prospect data (e.g., data related to prospective account holders such as demographics, income, trade lines, trade line history, family status, social media posting, employment, and/or the like). The data 110 may comprise clickstream data (e.g., internet browsing history). The data 110 may comprise SCORE platform data (e.g., card provider internal data). The data 110 may comprise email data (e.g., interactions with the account holder, text mining of email contents, and/or the like). The data 110 may comprise internal data, such as data from an authorization system, for instance, data indicative of account holder spending patterns, account holder security questions and/or the like. The internal data may comprise bank remittance data (e.g., data provided by banks regarding transaction data of the account holder, present and historical account balances, transactions, transaction timing, bill payment, and/or the like). The internal data may comprise account holder data (e.g., name, age, address, billing and payment habits, transaction patterns, income, trade lines, trade line history, family status, social media posting, employment, demographics and/or the like). The internal data may also comprise account monitoring data (e.g. credit bureau inquiries). Moreover, the internal data may comprise accounting monitoring data (e.g., credit bureau inquiries), merchant payments/servicing, risk/fraud data, corporate consumers data, digital marketing and offers-related data, and corporate data (e.g., HR data, payroll data, and/or real estate data).

The distributed storage system 106 may comprise a transaction network. A data storage controller 102 may comprise various modules and engines (as discussed herein), wherein the transaction data is made available to aspects of a system for test data provisioning 1 according to FIG. 2 (e.g., according to the logical connection(s) illustrated in FIG. 2). This data may be provided for the establishing of test data sets, whereby transaction data may be assessed according to defined parameters. This may further improve the functioning of the transaction network. For instance, this may enable the determination of the proper usage of differentiated transaction instruments, according to their proper purposes. For instance, data related to a transaction may be identified as being associated with a transaction, whereby the transaction network may tailor the handling of the transaction (e.g., by denying it). The transaction network may actively deter misuse of transaction products not intended such transactions. The transaction network may also allow transaction products intended for such transactions. Moreover, in response to an allowed transaction, the transaction network may deliver value-added services, such as electronically provided advertisements, offers, and/or other credit or lending products. In this manner, the transaction network more properly functions according to approved parameters.

Moreover, such identifications enhance credit risk discrimination, identification of businesses and consumers associated with a business organization who may presently be consumer account holders, whereby business-oriented transactions cards may be provided to them. Such identifications enable the promotion of relevant merchants to relevant account holders, such as to promote business-to-business relationship building and/or potential business-to-business relationships.

In various embodiments, the establishment of test data sets involves multiple complex and interactive machine steps. For instance, by evaluating the data 110 at a transaction level, assessing the nature of a transaction at the individual transaction level provides sufficient granularity. Data may be evaluated at the transaction level and/or aggregated such as to determine if an account holder (e.g., supplementary card holder, a third-party merchant with whom account holders or supplementary card holders engage in transactions, or any other transaction party) may be identified. Moreover, such identification may be combined with or enhance the identification of such aspects as account or card type, merchant industry codes, transaction amounts, number of transactions by an individual or a business in an industry (or at a particular merchant in an industry), determination of gross sales, removal of noise inducing transactions, and/or controlling for transactions having similar profiles (e.g., to facilitate further data processing).

Thus, it may be appreciated that in view of the preceding discussion, this disclosure may facilitate the identification of credit risk, likelihood of fraud, identification and classification of transactions (and counterparties to the transactions) to facilitate marketing, and tailoring of online ad experiences.

Figure 2:
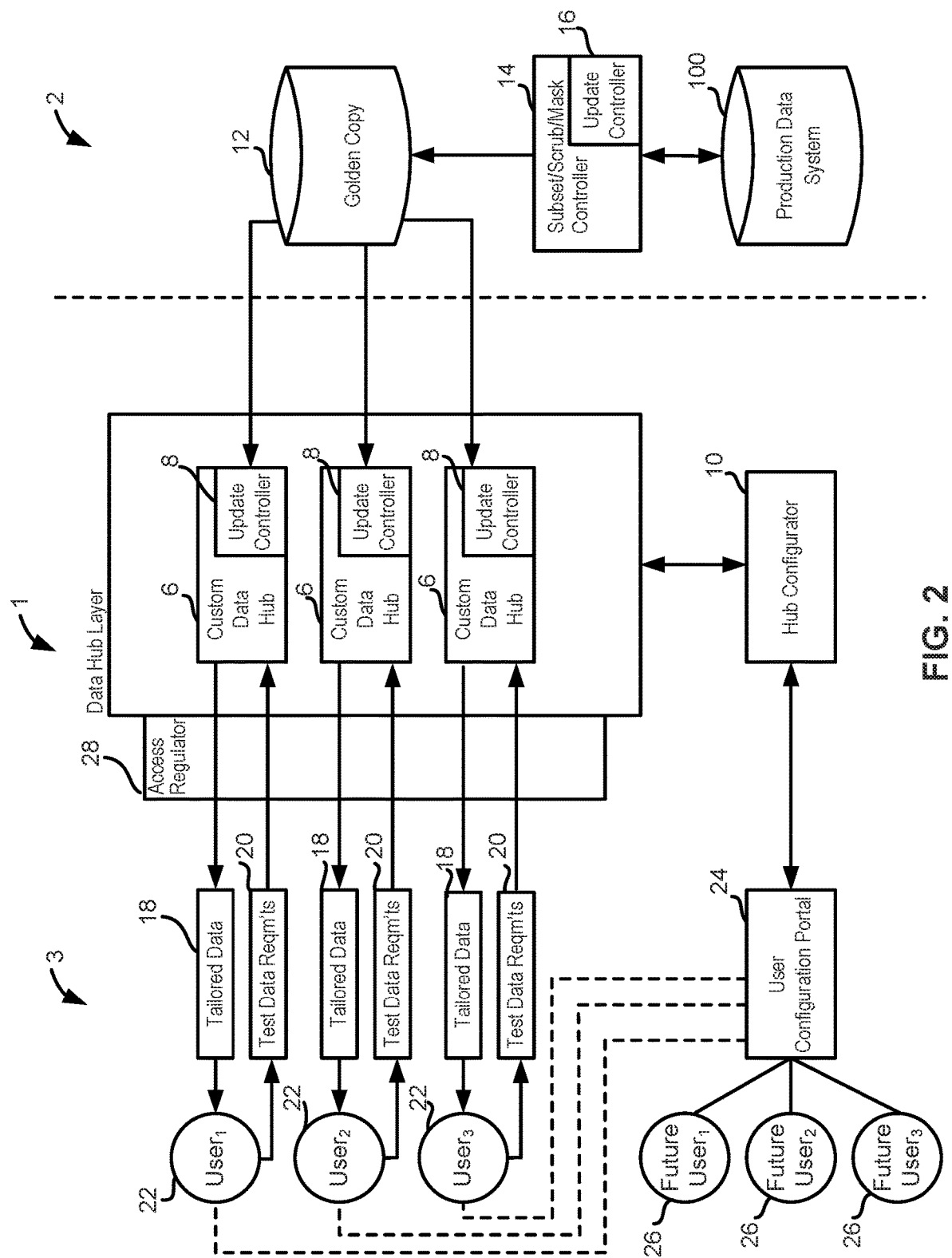
FIG. 2 illustrates an exemplary system for test data provisioning of data collected by a transaction processing network according to FIG. 1, in accordance with various embodiments.

In various embodiments, and with reference to FIG. 2, a system for test data provisioning 1 is described in more particular detail. For instance, a system for test data provisioning 1 may comprise various logical modules configured to perform various operations and processes, in accordance with methods disclosed herein.

Traditionally, test data provisioning involved millions of dollars spent on the manual process to gather and finalize test data characteristics, identifying and allocating test data to the test data characteristics, and resolving the defects related to poor quality of test data characteristics (e.g., due to informational deficiencies at the user level when the user is formulating the test data characteristics). As such, the system for test data provisioning 1 is provided to facilitate self-service by users and a large amount of coverage (for instance, 100% coverage) of test data to test cases (meaning that test data is sourced from the entire, massive set of data available to the system, rather than a more manageable subset, thus improving the quality of results). In this manner, the disclosure herein does not merely replace a manual process with an automated process, but improves the functioning of the computer network by making the entire volume of system data available for evaluation against test data characteristics. Furthermore, the network is improved as the data throughput from production to consumption is tailored so that irrelevant (or less relevant) data does not consume the limited bandwidth.

Moreover, such users may be internal diagnostic processes, humans, and/or electronic resources. For instance, a user such as americanexpress.com may provide a display of aspects such as an account summary, an opening balance, a closing balance, a list of transactions, card links, membership reward points, and/or the like. These aspects may source from a plurality of databases. These different databases may all retain a unique user identifier, so that the proper content can be served to the proper user.

However, in a testing environment, a manually assembled set of test databases with test user data may not be so associated. As such, in prior efforts, once a set of test databases were assembled with proper associations and defects resolved, the data may be used for extended periods, growing stale and being limited in scope—hampering test efforts.

A system for test data provisioning 1 may comprise a production environment 2 and a consumption environment 3. A production environment 2 may comprise various aspects with complete sets of data 110. For instance, a production data system 100 may be in communication with a golden copy database 12 via a subset/scrub/mask controller 14. The subset/scrub/mask controller 14 may perform operations on data from the production data system 100, and then store it into the golden copy database 12. For instance, production data 110 may be received from production data system 100 and scrubbed. Scrubbing may include the removal of confidential information, such as a transaction account number. Such data 110 may be subsetted, for instance, a golden copy database 12 may be limited to a subset. For instance, data 110 less than a first age, or data 110 arising from a first geography, or in various other contexts. Culling production data 110 outside the subset comprises subsetting. Such data 110 may be masked. For instance, masking may include replacing confidential information with other dummy information. For instance, a portion of the digits of a transaction account number may be replaced with zeros, or asterisks or the like.

The subset/scrub/mask controller 14 may comprise an update controller 16. The update controller 16 may poll the production data system 100 at a first golden copy polling interval and may then update the golden copy database 12. In this manner, the golden copy database 12 may remain "fresh," and the interactions with the consumption environment 3 (discussed further herein) may be isolated from the production data system 100, such as to prevent overloading production data system 100 resources and to facilitate the efficient functioning of the production data system 100, and yet permit the consumption environment 3 access to a fresh copy of the entire data 110 of the production data system 100.

Furthermore, and as mentioned above, the golden copy database 12 may comprise a periodically updated database of all data 110 that is retrieved from the production data system 100.

Having discussed each aspect of the production environment 2, attention is now directed to the consumption environment 3. The consumption environment 3 may comprise features and aspects, whereby users may access data for various purposes, specifically test data provisioning. For instance, a user 22 may comprise a human, an automated process, and/or a manually triggered process. One or more users 22 may develop test data characteristics 20 (also called "user requirements" or "TDCs"). A test data characteristic 20 may comprise a specific field or fields of the data 110 that is desired to be accessed, and/or limitations on the range of values in those fields desired to be accessed. For instance, a test data characteristic 20 may comprise a field such as account holder age, or transaction value. Test data characteristic 20 may be limited to a range of values such as ages 30-40 or a range of transaction values, such as transactions less than $15. A test data characteristic 20 may comprise any variety of aspects of the data 110 for which the user 22 desires to cull data not within the bounds of the test data characteristic 20. The user 22 may submit the test data characteristic 20 to a data hub layer 4 via an access regulator 28, both of which will be discussed in greater detail momentarily.

The consumption environment 3 may comprise an access regulator 28, as mentioned. The access regulator 28 may be configured to assess the identity of the user 22 and the types of test data characteristics 20 that the user 22 is authorized to access. For instance, a human test engineer may be forbidden to access test data characteristics 20 related to actual credit card numbers, whereas an automated process to verify the correspondence of credit card numbers to mathematical rules may be permitted to access test data characteristics 20 including credit card numbers, but prevented from accessing test data characteristics 20 related to card holder names.

The data hub layer 4 is a part of the consumption environment 3. The data hub layer 4 provides a logical boundary at the periphery of the consumption environment 3 and is interstitial between the production environment 2 and other aspects of the consumption environment 3. The data hub layer 4 interacts with the production environment 2, providing isolation between the production environment 2 and the other aspects of the consumption environment 3. For instance the data hub layer 4 may comprise an interstitial resource configured to allow user self-service comprising formulation and submission of test data characteristics 20 and receipt of tailored data 18. Specific aspects of the data hub layer 4 will be discussed further herein below.

The production environment 2 may also comprise a user configuration portal 24. User configuration portal 24 may comprise an interface whereby a current user 22 or a future user 26 may request the data hub layer 4 to provision mechanisms for that user 22 to submit test data characteristics 20 and receive tailored data 18 (e.g., so the user 22 or future user 26 may request that the data hub layer 4 provision a custom data hub 6 for that user 22 or future user 26). The user configuration portal 24 may be in logical communication with a hub configurator 10.

The hub configurator 10 may receive user requests from the user configuration portal 24 and may direct the data hub layer 4 to provision a new custom data hub 6 having a custom update controller 8 for a user 22 or future user 26.

Directing attention again to the data hub layer 4, as mentioned, a specific aspect of the data hub layer 4 may comprise a custom data hub 6. Custom data hub 6 may comprise a custom resource within the data hub layer 4 configured to retrieve tailored data 18 (only that data 110 corresponding to the test data characteristics 20 submitted by an associated user 22). The custom data hub 6 interacts with the golden copy database 12 to retrieve the requested data. Moreover, custom data hub 6 may comprise an update controller 8. Update controller 8 may comprise a polling engine configured to poll the golden copy database 12 at a first custom hub polling interval to retrieve data corresponding to the test data characteristics 20. Thus, in various embodiments, in addition to and/or in lieu of accessing the golden copy database 12 directly upon a transmission of tailored data 18 to a user, custom data hub 6 may comprise a hub database 9 comprising a database wherein the data retrieved in response to the polling is stored.

Finally, the consumption environment 3 may comprise tailored data 18. Tailored data 18 may comprise data conforming to the test data characteristics 20 and provided by the custom data hub 6 to an associated user 22. In this manner, each user 22 may be provided with timely data fitting that user's TDC and the production data system 100 may be isolated from user requests.

Figure 3:
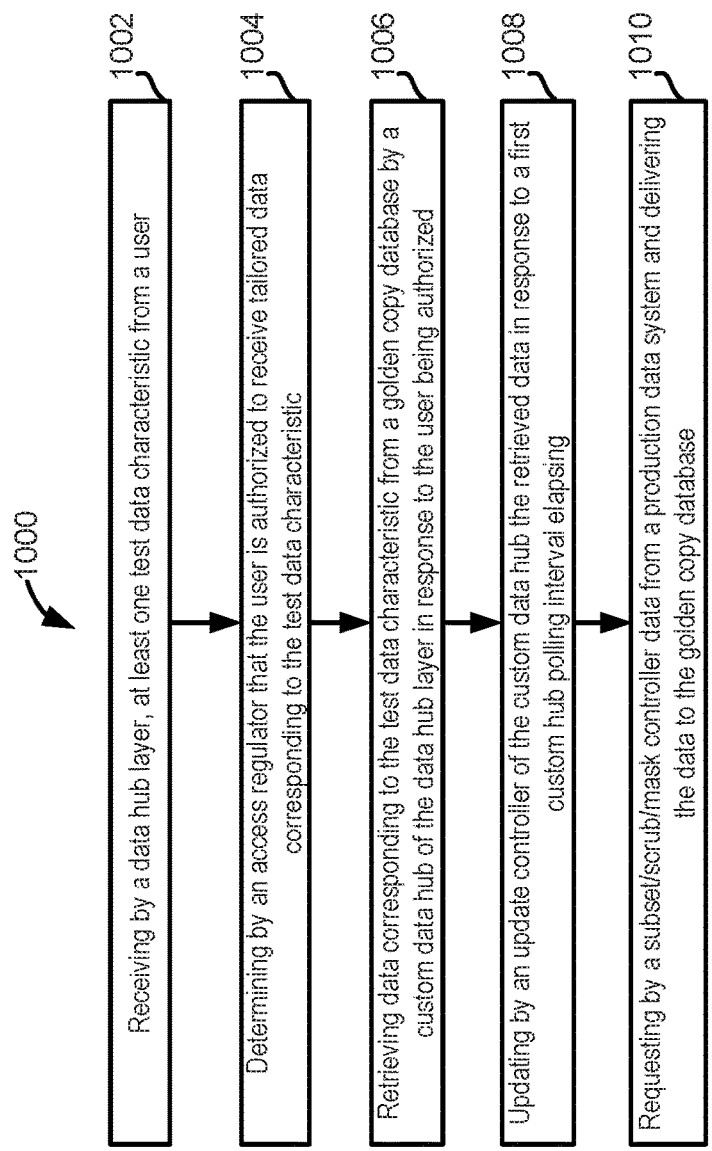
FIG. 3 illustrates an exemplary method of test data provisioning, in accordance with various embodiments.

Having discussed various aspects of a system for test data provisioning 1, reference is directed to FIG. 3, in addition to FIGS. 1 and 2. A method of test data provisioning 1000 is provided. The method 1000 may include receiving by a data hub layer 4, at least one test data characteristic 20 from a user 22 (step 1002). The method may further include determining by an access regulator 28 that the user 22 is authorized to receive tailored data 18 corresponding to the test data characteristic 20 (step 1004). In response to the user being authorized, a custom data hub 6 of the data hub layer 4 may retrieve data corresponding to the test data characteristic 20 from a golden copy database 12 (step 1006). An update controller 8 of the custom data hub 6 may update the retrieved data in response to a first custom hub polling interval elapsing (step 1008). In various embodiments, the method 1000 may comprise, requesting by a subset/scrub/mask controller 14 data from a production data system 100 and delivering the data to the golden copy database 12, whereby the production data system 100 is isolated from direct interaction with the data hub layer 4 (step 1010).

As discussed herein, may include "internal data." Internal data may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and/or a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

A "consumer profile," "customer data," or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT®, Windows 95/98/2000®, Windows XP®, Windows Vista®, Windows 7®, OS2, UNIX®, Linux®, Solaris®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
receiving, by a data hub layer, a test data characteristic from a user in a consumption environment,
wherein the test data characteristic comprises a field of data for accessing, and
wherein the test data characteristic comprises limitations on a range of values in the field of data for accessing;
determining, by an access regulator of the data hub layer, an identity of the user as a human or an automated process;
determining, by the access regulator of the data hub layer, a type of the test data characteristic that the user is authorized to access;
determining, by the access regulator of the data hub layer, and based on the identity and the type, that the user is authorized to receive tailored data corresponding to the test data characteristic;
polling, by an update controller of a custom data hub within the data hub layer, a golden copy database at a polling interval for the custom data hub to retrieve the tailored data corresponding to the test data characteristic, wherein the polling interval is set by a hub configurator configured to receive user requests from a user configuration portal and direct the data hub layer to provision the custom data hub having the update controller for the user in response to the user requests from the user configuration portal;

storing, by a hub database of the custom data hub, the tailored data received from the polling;

retrieving, by the custom data hub of the data hub layer, in response to the user being authorized, the tailored data corresponding to the test data characteristic from the golden copy database of a production environment;

updating, by the update controller of the custom data hub, the tailored data in response to the polling interval elapsing; and transmitting, by the custom data hub, the tailored data to the user.

2. The method of claim 1, further comprising:

requesting, by the data hub layer, data from a production data system;

periodically delivering, by the data hub layer, the data from the production data system to the golden copy database, wherein the production data system is isolated from direct interaction with the consumption environment by the data hub layer.

3. The method of claim 1, wherein the data hub layer comprises an interstitial logical boundary at a periphery of the consumption environment.

4. The method of claim 2, wherein the production data system is configured to authorize transaction account transactions.

5. The method of claim 3, further comprising:

receiving, by the data hub layer, a request to provision the custom data hub with a custom update controller for a user; and providing, by the data hub layer, the custom data hub to the user.

6. The method of claim 1, wherein the golden copy database comprises a periodically updated database configured to receive data retrieved from the production environment.

7. The method of claim 1, wherein the user configuration portal comprises an interface, wherein the user may request the data hub layer to provision the custom data hub, and wherein the user may submit the test data characteristic and receive the tailored data.

8. A system, comprising:

a computing device comprising a processor and a memory; and machine-readable instructions stored in the memory that, when executed by the processor, cause the computing device to at least:

receive a test data characteristic from a user in a consumption environment, wherein the test data characteristic comprises a field of data for accessing, and wherein the test data characteristic comprises limitations on a range of values in the field of data for accessing;

determine an identity of the user as a human or an automated process;

determine a type of the test data characteristic that the user is authorized to access;

determine, based on the identity and the type, that the user is authorized to receive tailored data corresponding to the test data characteristic;

poll a golden copy database at a polling interval for a custom data hub to retrieve the tailored data corresponding to the test data characteristic, wherein the polling interval is set by a hub configurator configured to receive user requests from a user configuration portal and direct the machine-readable instructions to provision the custom data hub for the user in response to the user requests from the user configuration portal;

store the tailored data received from polling;

retrieve, in response to the user being authorized, the tailored data corresponding to the test data characteristic from the golden copy database of a production environment;

update the tailored data in response to the polling interval elapsing; and transmit the tailored data to the user.

9. The system of claim 8, wherein the machine-readable instructions further cause the computing device to at least:

request data from a production data system; and periodically deliver the data from the production data system to the golden copy database, wherein the production data system is isolated from direct interaction with the consumption environment.

10. The system of claim 2, wherein the production data system is configured to authorize transaction account transactions.

11. The system of claim 8, wherein the machine-readable instructions further cause the computing device to at least:

receive a request to provision the custom data hub with a custom update controller for a user; and provide the custom data hub to the user.

12. The system of claim 8, wherein the golden copy database comprises a periodically updated database configured to receive data retrieved from the production environment.

13. The system of claim 8, wherein the user configuration portal comprises an interface, wherein the user may request the machine-readable instructions to provision the custom data hub, and wherein the user may submit the test data characteristic and receive the tailored data.

14. A non-transitory, computer-readable medium comprising machine-readable instructions that, when executed by a processor of a computing device, cause the computing device to at least:

receive a test data characteristic from a user in a consumption environment, wherein the test data characteristic comprises a field of data for accessing, and wherein the test data characteristic comprises limitations on a range of values in the field of data for accessing;

determine an identity of the user as a human or an automated process;

determine a type of the test data characteristic that the user is authorized to access;

determine, based on the identity and the type, that the user is authorized to receive tailored data corresponding to the test data characteristic;

poll a golden copy database at a polling interval for a custom data hub to retrieve the tailored data corresponding to the test data characteristic, wherein the polling interval is set by a hub configurator configured to receive user requests from a user configuration portal and direct the machine-readable instructions to provision the custom data hub for the user in response to the user requests from the user configuration portal;

store the tailored data received from polling;

retrieve, in response to the user being authorized, the tailored data corresponding to the test data characteristic from the golden copy database of a production environment;

update the tailored data in response to the polling interval elapsing; and transmit the tailored data to the user.

15. The non-transitory, computer-readable medium of claim 14, wherein the machine-readable instructions, when executed, further cause the computing device to at least:

request data from a production data system; and periodically deliver the data from the production data system to the golden copy database, wherein the production data system is isolated from direct interaction with the consumption environment.

16. The non-transitory, computer-readable medium of claim 15, wherein the production data system is configured to authorize transaction account transactions.

17. The non-transitory, computer-readable medium of claim 14, wherein the machine-readable instructions, when executed, further cause the computing device to at least:

receive a request to provision the custom data hub with a custom update controller for a user; and provide the custom data hub to the user.

18. The non-transitory, computer-readable medium of claim 14, wherein the golden copy database comprises a periodically updated database configured to receive data retrieved from the production environment.

19. The non-transitory, computer-readable medium of claim 14, wherein the user configuration portal comprises an interface, wherein the user may request the machine-readable instructions to provision the custom data hub, and wherein the user may submit the test data characteristic and receive the tailored data.

* * * * *